(12) United States Patent
Ullah

(10) Patent No.: US 6,923,093 B2
(45) Date of Patent: Aug. 2, 2005

(54) TOOL DRIVE SYSTEM

(76) Inventor: Rizwan Ullah, House #781 Street - 76, I-8/3 Islamabad (PK)

( * ) Notice: Subject to any disclaimer, the term of this patent is extended or adjusted under 35 U.S.C. 154(b) by 0 days.

(21) Appl. No.: 10/696,887

(22) Filed: Oct. 29, 2003

(65) Prior Publication Data

US 2004/0084195 A1 May 6, 2004

Related U.S. Application Data

(60) Provisional application No. 60/422,024, filed on Oct. 29, 2002.

(51) Int. Cl.[7] .............................................. B25B 17/00
(52) U.S. Cl. .................................................... 81/57.26
(58) Field of Search ...................... 81/57.26, 57, 57.28, 81/57.29; 74/417

(56) References Cited

U.S. PATENT DOCUMENTS 4,296,654 A * 10/1981 Mercer ...................... 81/57.26
4,748,872 A * 6/1988 Brown ....................... 81/57.26

* cited by examiner

*Primary Examiner*—Jacob K. Ackun, Jr.
(74) *Attorney, Agent, or Firm*—Stoneman Law Offices, Ltd.; Martin L. Stoneman; Benjamin K. Erlick

(57) ABSTRACT

A tool drive system for transferring rotational power from a rotational tool, such as a drill or ratchet, to at least one input drive shaft which then transfers the power to at least one output drive shaft. The angle of at least one input drive shaft being adjustable relative to at least one output shaft. The tool drive system comprises a round housing with an angle adjuster attached to the input shaft that assists in adjusting and locking the angle of the input shaft relative to the output shaft in an almost circular span. The input and output shafts may be positioned in a user-selected gear ratio from the input to output shafts or vice versa.

14 Claims, 8 Drawing Sheets

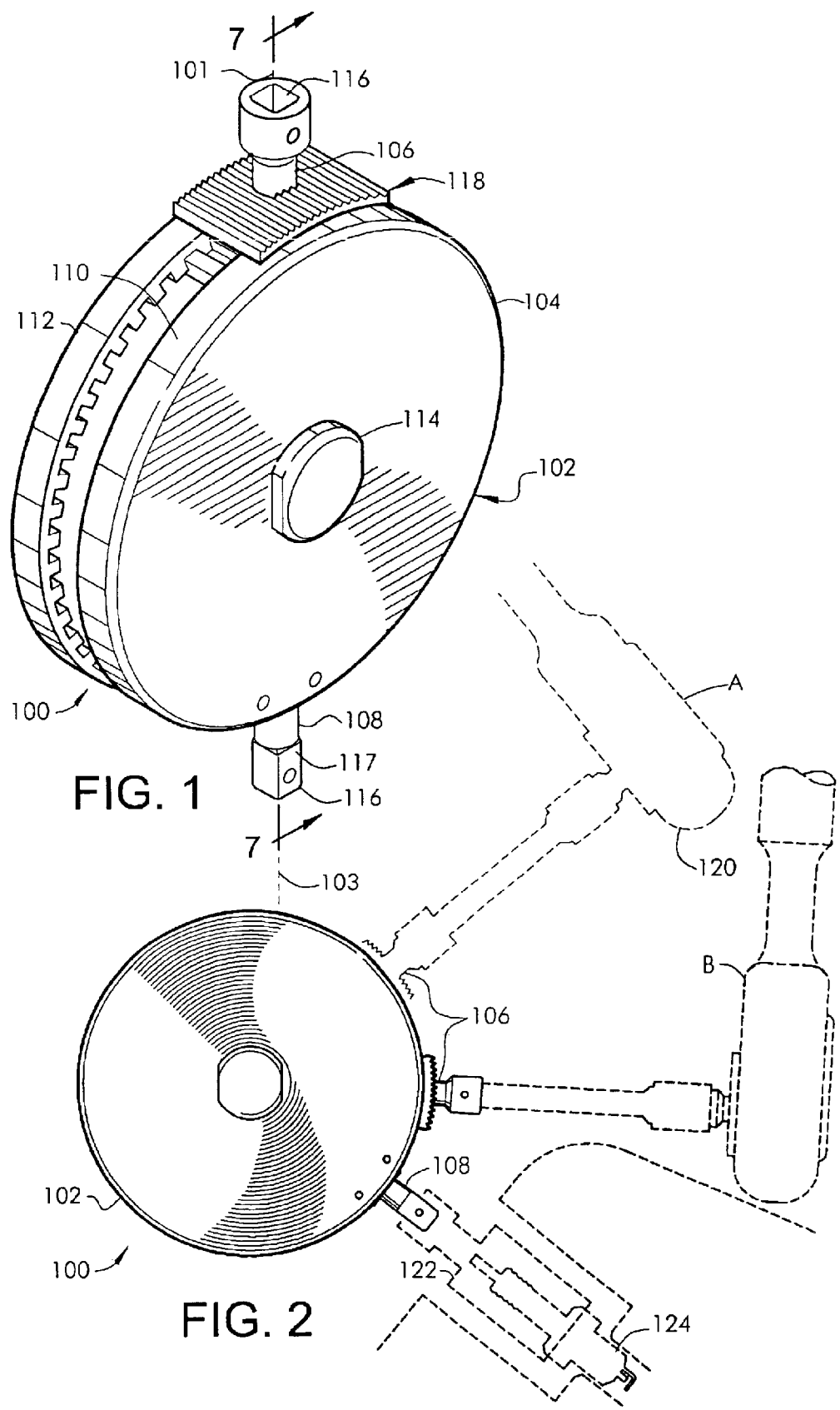

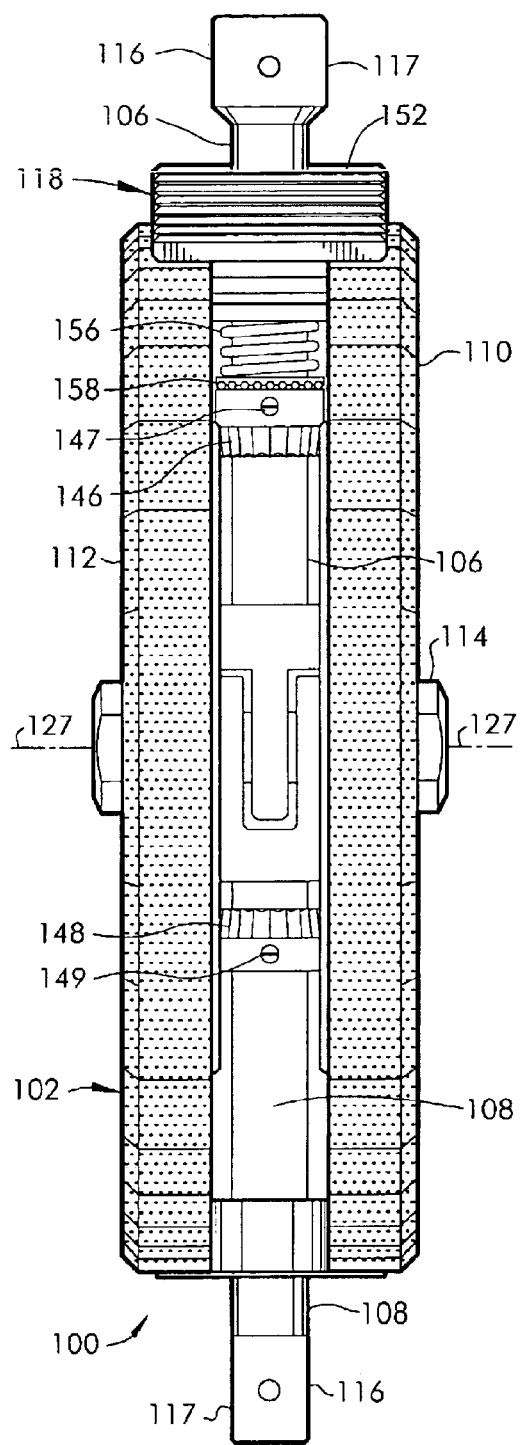
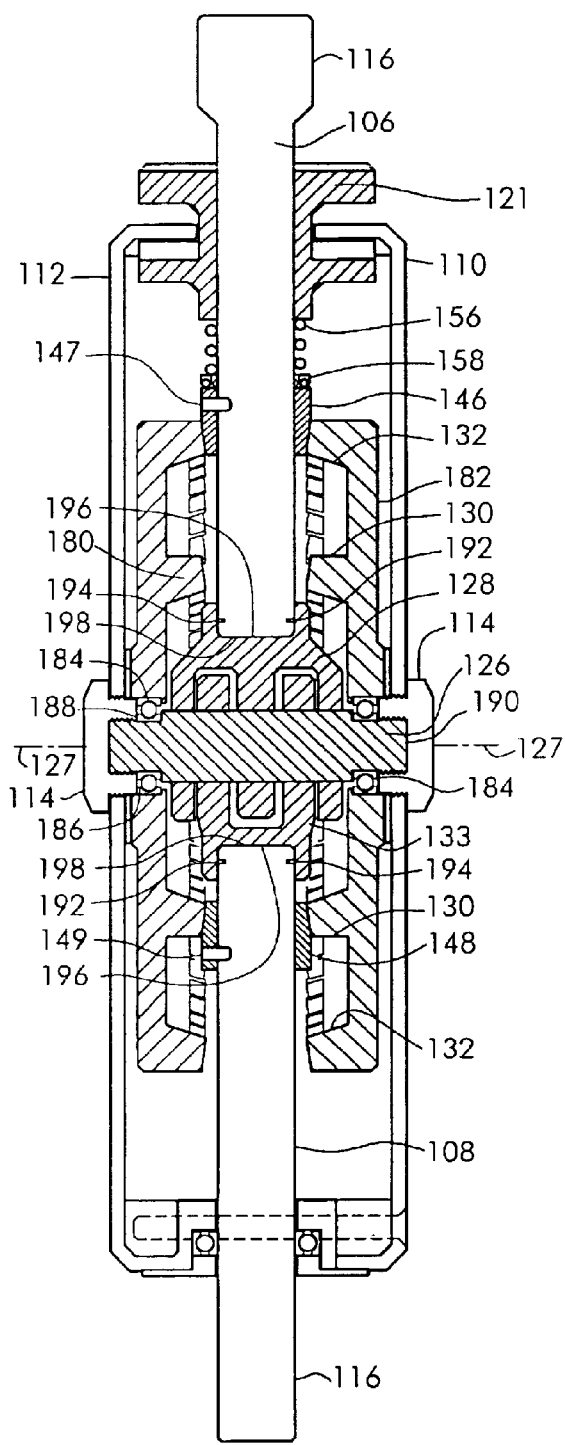
FIG. 6
FIG. 7

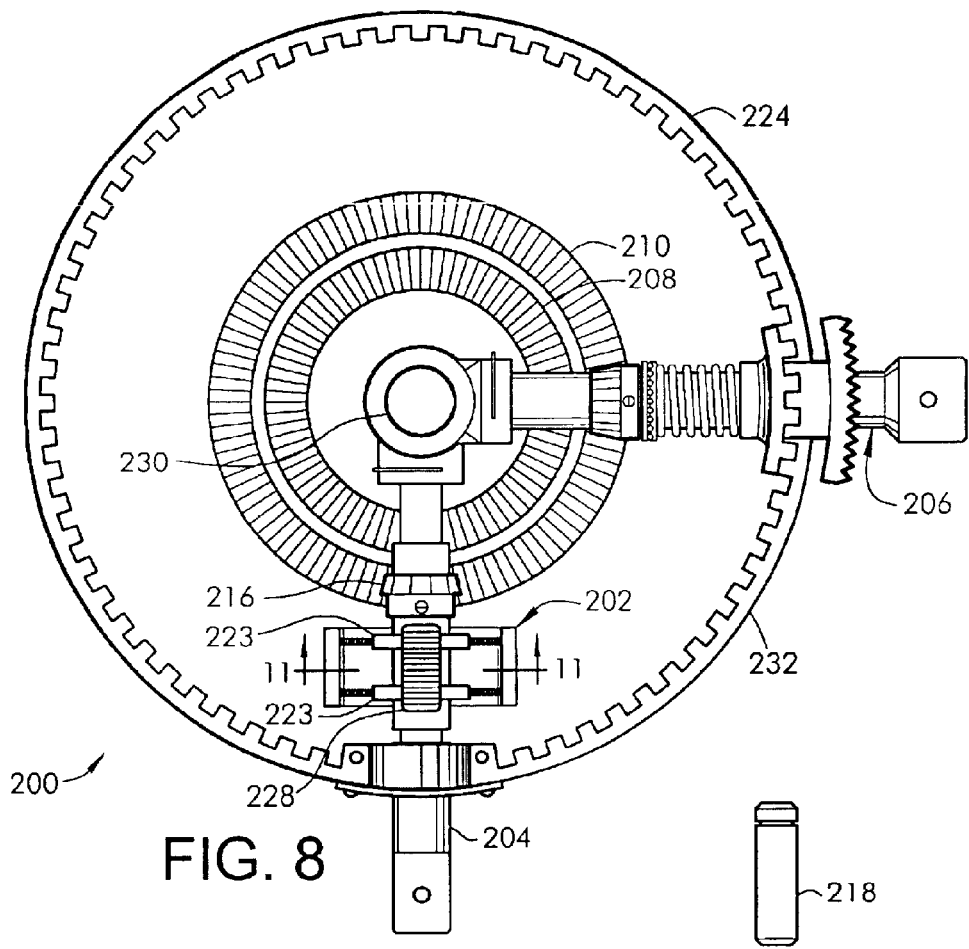
FIG. 8
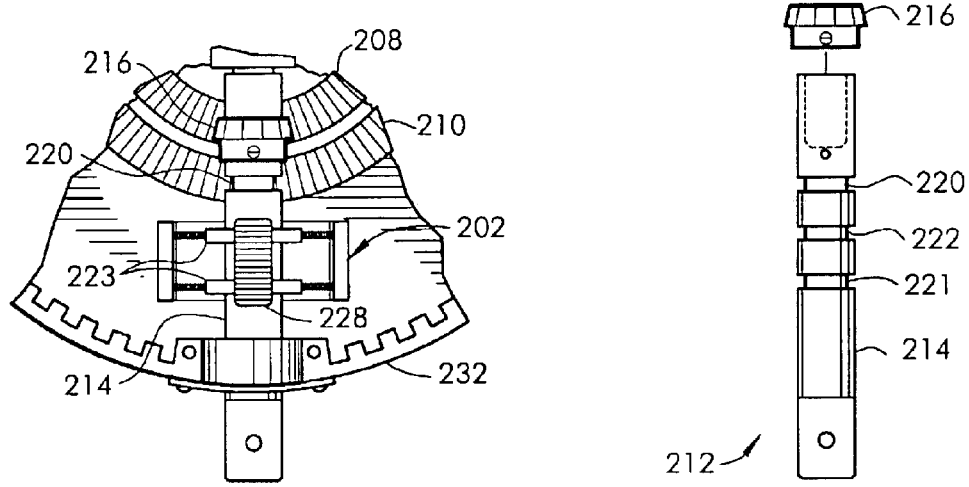
FIG. 9
FIG. 10

TOOL DRIVE SYSTEM

CROSS-REFERENCE TO RELATED APPLICATION

The present application is related to prior provisional application Serial No. 60/422,024, filed Oct. 29, 2002, entitled "TOOL DRIVE SYSTEM", from which priority is claimed, the contents of which are incorporated herein by this reference and are not admitted to be prior art with respect to the present invention by the mention in this cross-reference section.

BACKGROUND

This invention relates to providing a tool drive system for transferring rotational power from at least one first driver to at least one second driver. More specifically, it relates to a tool drive system providing at least one input and, at least one output, drive shaft in which the angle of at least one drive shaft is adjustable.

Typically, a user may utilize a tool drive system such as, for example, a ratchet tool, to turn a tool attachment sized to remove a fastener such as a bolt or screw. Typically, such fasteners are located in a variety of angular positions relative to the drive tool. Removal with a tool driver that has a fixed position can result in difficult user positions and decreased leverage or limited workspace. It would be advantageous to utilize a tool driver having adjustable positions and a tool driver that would provide a choice of gearing or leverage for the user.

OBJECTS OF THE INVENTION

A primary object and feature of the present invention is to provide a tool drive system for adjusting the angles of an input shaft and at least one output shaft.

It is a further object and feature of the present invention to provide such a tool drive system that provides an increase in the leverage of the user.

It is a further object and feature of the present invention to assist in providing a speed differential between the input and output of each respective drive element.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a tool drive system comprising, in combination: at least one rotatable first shaft comprising at least one first gear, having at least one first axis of rotation; at least one rotatable second shaft comprising at least one second gear, having at least one second axis of rotation; and movement transfer means for rotating such at least one rotatable second shaft when such at least one rotatable first shaft is rotated; wherein such movement transfer means further comprises connector means for connecting such at least one rotatable first shaft and such at least one rotatable second shaft, angle setting means for setting at least one angle between such at least one first axis of rotation and such at least one second axis of rotation, and balancing means for using opposed gear plates to balance torque transfer between such at least one first gear and such at least one second gear.

In accordance with another preferred embodiment hereof, this invention provides a tool drive system comprising, in combination: at least one rotatable first shaft comprising at least one first gear, having at least one first axis of rotation; at least one rotatable second shaft comprising at least one second gear, having at least one second axis of rotation; and movement transfer means for rotating such at least one rotatable second shaft when such at least one rotatable first shaft is rotated; wherein such movement transfer means further comprises connector means for connecting such at least one rotatable first shaft and such at least one rotatable second shaft, and angle setting means for setting at least one angle between such at least one first axis of rotation and such at least one second axis of rotation; wherein such connector means comprises, at least one bar, having at least one bar axis perpendicular to both such at least one first axis of rotation and such at least one second axis of rotation, and wherein both such at least one rotatable first shaft and such at least one rotatable second shaft are rotatably mounted to such bar.

In accordance with yet another preferred embodiment hereof, this invention provides a tool drive system comprising, in combination: at least one rotatable first shaft comprising at least one first gear, having at least one first axis of rotation; at least one rotatable second shaft comprising at least one second gear, having at least one second axis of rotation; and movement transfer means for rotating such at least one rotatable second shaft when such at least one rotatable first shaft is rotated; wherein such movement transfer means further comprises connector means for connecting such at least one rotatable first shaft and such at least one rotatable second shaft, and angle setting means for setting at least one angle between such at least one first axis of rotation and such at least one second axis of rotation; and wherein such angle setting means comprises positive locking means for positive positional locking of the at least one angle.

In accordance with still another preferred embodiment hereof, this invention provides a tool drive system comprising, in combination: at least one rotatable first shaft comprising at least one first gear, having at least one first axis of rotation; at least one rotatable second shaft comprising at least one second gear, having at least one second axis of rotation; and movement transfer means for rotating such at least one rotatable second shaft when such at least one rotatable first shaft is rotated; at least one gear plate comprising at least one first unique circular set of first gear teeth on such at least one gear plate and at least one second unique circular set of second gear teeth on such at least one gear plate; gear positioning means for positioning at least one of such at least one first gear and such at least one second gear in a gear-tooth-locking relationship with a user-selected one of such at least one first unique circular set of first gear teeth on such at least one gear plate and such at least one second unique circular set of second gear teeth on such at least one gear plate; wherein such movement transfer means further comprises connector means for connecting such at least one rotatable first shaft and such at least one rotatable second shaft, and angle setting means for setting at least one angle between such at least one first axis of rotation and such at least one second axis of rotation; and, wherein such angle setting means comprises housing means for positionally stabilizing the at least one angle.

In accordance with another preferred embodiment hereof, this invention provides a tool drive system comprising, in combination: at least one rotatable first shaft comprising at least one first gear, having at least one first axis of rotation; at least one rotatable second shaft comprising at least one second gear, having at least one second axis of rotation; and movement transfer means for rotating such at least one rotatable second shaft when such at least one rotatable first shaft is rotated; wherein such movement transfer means further comprises connector means for connecting such at least one rotatable first shaft and such at least one rotatable second shaft, angle setting means for setting at least one angle between such at least one first axis of rotation and such at least one second axis of rotation; and balancing means for using opposed gear plates to balance torque transfer between such at least one first gear and such at least one second gear; wherein such angle setting means comprises housing means for positionally stabilizing the at least one angle; and wherein such housing means comprises positive locking means for positive positional locking of the at least one angle.

In accordance with another preferred embodiment hereof, this invention provides a tool drive system comprising, in combination: at least one rotatable first shaft comprising at least one first gear, having at least one first axis of rotation; at least one rotatable second shaft comprising at least one second gear, having at least one second axis of rotation; and at least one movement transferer structured and arranged to rotate such at least one rotatable second shaft when such at least one rotatable first shaft is rotated; wherein such at least one movement transferer further comprises at least one connector structured and arranged to connect such at least one rotatable first shaft and such at least one rotatable second shaft, at least one angle setter structured and arranged to set at least one angle between such at least one first axis of rotation and such at least one second axis of rotation, and at least one balancer structured and arranged to use opposed gear plates to balance torque transfer between such at least one first gear and such at least one second gear.

It also provides such a system wherein such at least one rotatable first shaft further comprises at least two first shafts, each respective shaft comprising at least one first gear, having at least one first axis of rotation. And, it provides such a system wherein such angle setter comprises a positive lock structured and arranged to positively positionally lock the at least one angle. Further, it provides such a system wherein such at least one angle setter comprises at least one housing structured and arranged to positionally stabilize the at least one angle.

Even further, it provides such a system further comprising: at least one gear plate comprising at least one first unique circular set of first gear teeth on such at least one gear plate and at least one second unique circular set of second gear teeth on such at least one gear plate; and at least one gear positioner structured and arranged to position at least one of such at least one first gear and such at least one second gear in a gear-tooth-locking relationship with a user-selected one of such at least one first unique circular set of first gear teeth on such at least one gear plate and such at least one second unique circular set of second gear teeth on such at least one gear plate.

Still further, it provides such a system wherein such at least one connector comprises, at least one bar, having at least one bar axis perpendicular to both such at least one first axis of rotation and such at least one second axis of rotation; wherein both such at least one rotatable first shaft and such at least one rotatable second shaft are rotatably mounted to such bar. And, it provides such a system wherein such at least one angle setter comprises at least one positive lock structured and arranged to positive positionally lock the at least one angle. It also provides such a system further comprising: at least one gear plate comprising at least one first unique circular set of first gear teeth on such at least one gear plate and at least one second unique circular set of second gear teeth on such at least one gear plate; and at least one gear positioner structured and arranged to position at least one of such at least one first gear and such at least one second gear in a gear-tooth-locking relationship with a user-selected one of such at least one first unique circular set of first gear teeth on such at least one gear plate and such at least one second unique circular set of second gear teeth on such at least one gear plate; wherein such at least one angle setter comprises at least one housing structured and arranged to positionally stabilize the at least one angle.

In accordance with another preferred embodiment hereof, this invention provides a tool drive system comprising, in combination: at least one rotatable first shaft comprising at least one first gear, having at least one first axis of rotation; at least one rotatable second shaft comprising at least one second gear, having at least one second axis of rotation; and at least one movement transferer structured and arranged to rotate such at least one rotatable second shaft when such at least one rotatable first shaft is rotated; wherein such at least one movement transferer further comprises at least one connector structured and arranged to connect such at least one rotatable first shaft and such at least one rotatable second shaft, and at least one angle setter structured and arranged to set at least one angle between such at least one first axis of rotation and such at least one second axis of rotation; wherein such at least one connector comprises, at least one bar, having at least one bar axis perpendicular to both such at least one first axis of rotation and such at least one second axis of rotation, and wherein both such at least one rotatable first shaft and such at least one rotatable second shaft are rotatably mounted to such bar.

Additionally, it provides such a system wherein such at least one angle setter comprises at least one positive lock structured and arranged to positive positionally lock the at least one angle. And, it provides such a system further comprising: at least one gear plate comprising at least one first unique circular set of first gear teeth on such at least one gear plate and at least one second unique circular set of second gear teeth on such at least one gear plate; at least one gear positioner structured and arranged to position at least one of such at least one first gear and such at least one second gear in a gear-tooth-locking relationship with a user-selected one of such at least one first unique circular set of first gear teeth on such at least one gear plate and such at least one second unique circular set of second gear teeth on such at least one gear plate; wherein such at least one angle setter comprises at least one housing structured and arranged to positionally stabilize the at least one angle.

In accordance with another preferred embodiment hereof, this invention provides a tool drive system comprising, in combination: at least one rotatable first shaft comprising at least one first gear, having at least one first axis of rotation; at least one rotatable second shaft comprising at least one second gear, having at least one second axis of rotation; and at least one movement transferer structured and arranged to rotate such at least one rotatable second shaft when such at least one rotatable first shaft is rotated; wherein such at least one movement transferer further comprises at least one connector structured and arranged to connect such at least one rotatable first shaft and such at least one rotatable second shaft, and at least one angle setter structured and arranged to set at least one angle between such at least one first axis of rotation and such at least one second axis of rotation wherein such at least one angle setter comprises at least one positive lock structured and arranged to positive positionally lock the at least one angle.

Moreover, it provides such a system further comprising: at least one gear plate comprising at least one first unique circular set of first gear teeth on such at least one gear plate and at least one second unique circular set of second gear teeth on such at least one gear plate; and at least one gear positioner structured and arranged to position at least one of such at least one first gear and such at least one second gear in a gear-tooth-locking relationship with a user-selected one of such at least one first unique circular set of first gear teeth on such at least one gear plate and such at least one second unique circular set of second gear teeth on such at least one gear plate; wherein such at least one angle setter comprises at least one housing structured and arranged to positionally stabilize the at least one angle.

Further, it provides such a system wherein: such at least one housing comprises a circular periphery; such circular periphery comprises a set of evenly-spaced teeth; at least one of such at least one rotatable first shaft and at least one rotatable second shaft comprises at least one shaft housing element comprising at least one shaft housing tooth structured and arranged to fit between a pair of such evenly-spaced teeth; and such at least one shaft housing tooth is removably engagable with such evenly-spaced teeth, wherein the user may set such at least one angle.

In accordance with still another preferred embodiment hereof, this invention provides a tool drive system comprising, in combination: at least one rotatable first shaft comprising at least one first gear, having at least one first axis of rotation; at least one rotatable second shaft comprising at least one second gear, having at least one second axis of rotation; at least one movement transferer structured and arranged to rotate such at least one rotatable second shaft when such at least one rotatable first shaft is rotated; at least one gear plate comprising at least one first unique circular set of first gear teeth on such at least one gear plate and at least one second unique circular set of second gear teeth on such at least one gear plate; and at least one gear positioner structured and arranged to position at least one of such at least one first gear and such at least one second gear in a gear-tooth-locking relationship with a user-selected one of such at least one first unique circular set of first gear teeth on such at least one gear plate and such at least one second unique circular set of second gear teeth on such at least one gear plate; wherein such at least one movement transferer further comprises at least one connector structured and arranged to connect such at least one rotatable first shaft and such at least one rotatable second shaft, and at least one angle setter structured and arranged to set at least one angle between such at least one first axis of rotation and such at least one second axis of rotation, and wherein such at least one angle setter comprises at least one housing structured and arranged to positionally stabilize the at least one angle.

Further, it provides such a system wherein: such at least one gear plate comprises N unique circular sets of gear teeth on such at least one gear plate; and such at least one gear positioner permits a user-selected positioning of at least one of such at least one first gear and such at least one second gear in a gear-tooth-locking relationship with a user-selected one of such N unique circular sets of gear teeth on such at least one gear plate; wherein N is a whole number greater than one. And, it provides such a system wherein such at least one angle setter comprises at least one positive lock structured and arranged to positive positionally lock the at least one angle.

Still further, it provides such a system wherein such at least one rotatable first shaft further comprises a plurality of circumferential grooves. And, it provides such a system wherein: such at least one gear positioner comprises at least one spring-loaded retractable-pin element structured and arranged to stabilize at least one longitudinal position of such at least one rotatable first shaft by entry into at least one such circumferential groove; wherein at least one longitudinal position of at least one of such at least one first gear and such at least one second gear may be user selectable; and wherein a gear ratio may be user selected.

In accordance with yet another preferred embodiment hereof, this invention provides a tool drive system comprising, in combination: at least one rotatable first shaft comprising at least one first gear, having at least one first axis of rotation; at least one rotatable second shaft comprising at least one second gear, having at least one second axis of rotation; and at least one movement transferer structured and arranged to rotate such at least one rotatable second shaft when such at least one rotatable first shaft is rotated; wherein such at least one movement transferer further comprises, at least one connector structured and arranged to connect such at least one rotatable first shaft and such at least one rotatable second shaft, at least one angle setter structured and arranged to set at least one angle between such at least one first axis of rotation and such at least one second axis of rotation, and at least one balancer structured and arranged to use opposed gear plates to balance torque transfer between such at least one first gear and such at least one second gear; wherein such at least one angle setter comprises at least one housing structured and arranged to positionally stabilize the at least one angle; and wherein such at least one housing comprises at least one positive lock structured and arranged to positively positionally lock the at least one angle.

Even further, it provides such a system further comprising: at least one gear plate comprising at least one first unique circular set of first gear teeth on such at least one gear plate and at least one second unique circular set of second gear teeth on such at least one gear plate; and at least one gear positioner structured and arranged to position at least one of such at least one first gear and such at least one second gear in a gear-tooth-locking relationship with a user-selected one of such at least one first unique circular set of first gear teeth on such at least one gear plate and such at least one second unique circular set of second gear teeth on such at least one gear plate.

And, it provides such a system wherein such at least one connector comprises, at least one bar, having at least one bar axis perpendicular to both such at least one first axis of rotation and such at least one second axis of rotation; wherein both such at least one rotatable first shaft and such at least one rotatable second shaft are rotatably mounted to such bar.

It also provides such a system wherein such at least one bar connects such housing with such at least one rotatable first shaft and such at least one rotatable second shaft. And, it provides such a system wherein: such at least one housing comprises a circular periphery; such circular periphery comprises a set of evenly-spaced teeth; at least one of such at least one rotatable first shaft and at least one rotatable second shaft comprises at least one shaft housing element comprising at least one shaft housing tooth structured and arranged to fit between a pair of such evenly-spaced teeth; and such at least one shaft housing tooth is removably engagable with such evenly-spaced teeth, wherein the user may set such at least one angle.

BRIEF DESCRIPTION OF THE DRAWINGS

FIG. 1 is a perspective view of the tool drive system according to a preferred embodiment of the present invention.

FIG. 2 is a side view, partially in section, of the tool drive system of FIG. 1 illustrating the angle adjustability of the input shaft according to a preferred embodiment of the present invention.

FIG. 6 is a side view of the tool drive system of FIG. 1.

FIG. 7 is a sectional view through section 7—7 of FIG. 1.

FIG. 8 is a side view of one-half of the tool drive system illustrating an embodiment comprising a gear adjusting mechanism according to another preferred embodiment of the present invention.

FIG. 9 is a detail of the gear adjusting mechanism of FIG. 8 according to another preferred embodiment of the present invention.

FIG. 10 is an exploded view, partially in section, of the adjustable-gear drive shaft assembly of the tool system of FIG. 8.

DETAILED DESCRIPTION OF A PREFERRED EMBODIMENT OF THE INVENTION

Figure 3:
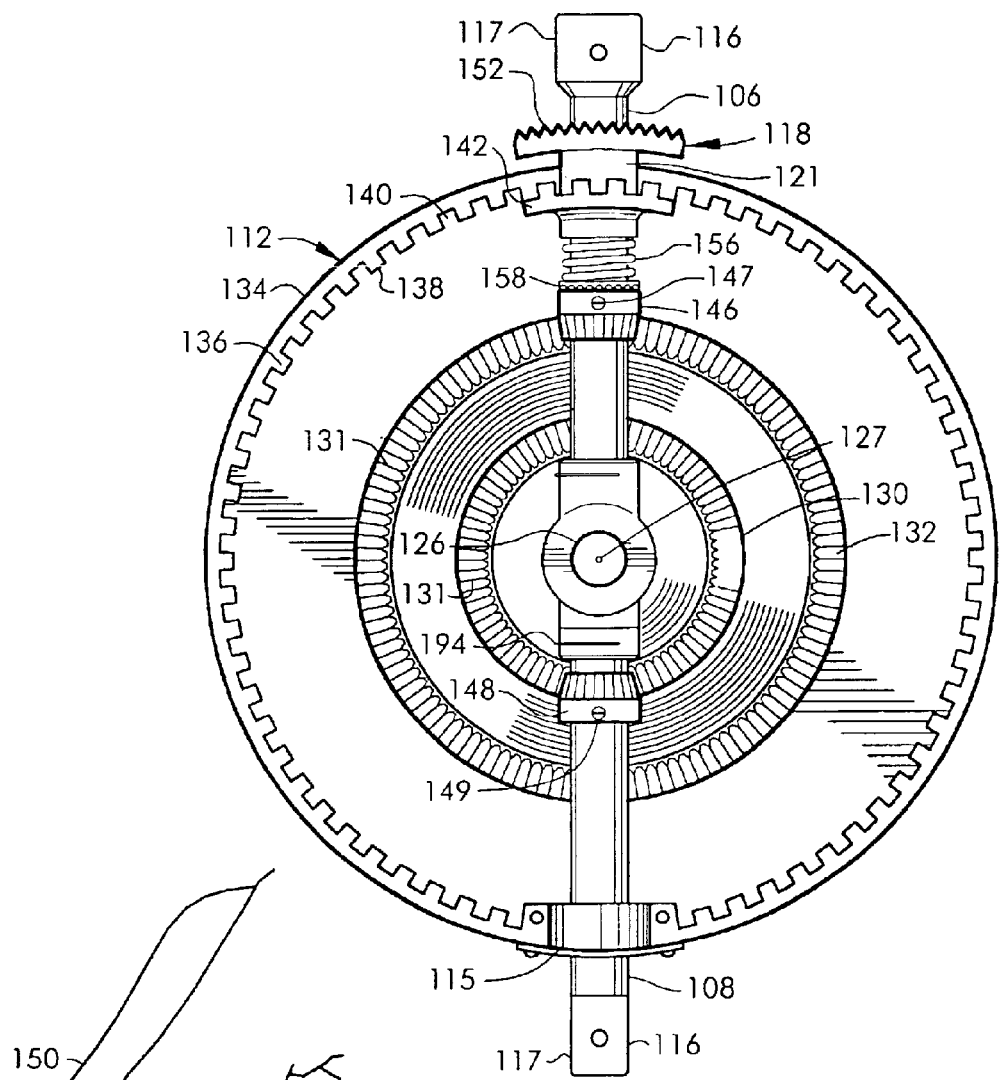
FIG. 3 is a side view of one-half of the tool drive system of FIG. 1.

Reference is now made to the drawings. FIG. 1 is a perspective view of the tool drive system 100 according to a preferred embodiment of the present invention. Preferably, the tool drive system 100 comprises a power transfer assembly 102, as shown. Preferably, the power transfer assembly 102 comprises a housing 104, an input shaft 106, having an axis of rotation 101 and an output shaft 108 having an axis of rotation 103, as shown (embodying herein movement transfer means for rotating such at least one rotatable second shaft when such at least one rotatable first shaft is rotated). Preferably, the housing 104 is split into two halves, half 110 and half 112. Preferably, each respective half 110 and half 112 are connected, preferably by a connector 114 (embodying herein wherein such movement transfer means further comprises connector means for connecting such at least one rotatable first shaft and such at least one rotatable second shaft; and embodying herein at least one movement transferer structured and arranged to rotate such at least one rotatable second shaft when such at least one rotatable first shaft is rotated), which will be further described below. Preferably, the input shaft 106 and the output shaft 108 each comprise a tool connector 116, preferably a universal connector, preferably a socket-drive connector such as, for example, a square socket driver 117, as shown. Typical use in automotive situations might be, for example, a ⅜-inch diameter square socket driver 117; and typical sizes for the other elements of this invention will be typically in relative proportion, as shown.

Upon reading the teachings of this specification, those with ordinary skill in the art will now understand that, under appropriate circumstances, considering such issues as economics, user preference, etc., other universal tool connectors, may suffice. For example, many tools such as powered drills have chucks that provide for attachment of such drivers including socket-drivers, screw-drivers, etc. Furthermore, air-tool drivers also provide for assorted attachments. Even further, hand-powered tool drivers provide for assorted attachments. Many of such rotational drivers may be adapted to be used with the tool drive system 100 herein disclosed.

Preferably, the input shaft 106 is adjustable in a plurality of angular positions relative to the output shaft 108, preferably along a single circumferential path, as shown. Preferably, the input shaft 106 comprises an angle-adjuster assembly 118 (embodying herein angle setting means for setting at least one angle between such at least one first axis of rotation and such at least one second axis of rotation; and, embodying herein set at least one angle between such at least one first axis of rotation and such at least one second axis of rotation), as shown. Upon reading the teachings of this specification, those with ordinary skill in the art will now understand that, under appropriate circumstances, considering such issues as economics, user preference, durability, etc., other angle-adjusting arrangements, such as universal joints, etc., may suffice.

FIG. 2 is a side view, partially in section, of the tool drive system 100 of FIG. 1 illustrating the angle adjustability of the input shaft 106 according to a preferred embodiment of the present invention. FIG. 2 illustrates a preferred embodiment wherein the input shaft 106 has a rotatable drill 120 attached to the input shaft 106 and a socket 122 (for example, such as may be used to remove a spark plug 124, as shown) attached to the output shaft 108. Preferably, the input shaft 106 may be positioned in a plurality of positions, such as illustrated by position A and position B. FIG. 2 illustrates such position as might be convenient to the user while still producing a rotating output shaft 108 to turn, for example, socket 122, as shown.

Preferably, in operation, a rotation of the input shaft 106 results in a rotation of the output shaft 108. Upon reading the teachings of this specification, those with ordinary skill in the art will now understand that, under appropriate circumstances, considering such issues as economics, user preference, materials, durability, etc., other rotation arrangements, may suffice. For example, the input shaft 106 and output shaft 108 may be exchanged such that the input shaft 106 is the output shaft (and adjustable) wherein the output shaft 108 is the input shaft 106. Preferably, such exchange also provides different gearing and leverage as will be further explained below.

FIG. 3 is a side view of one-half 112 of the tool drive system 100 of FIG. 1. It is noted that, preferably, each respective half 110 and 112 is a mirror image of each other (except for the connection of the input shaft 106 and output shaft 108). For illustration, FIG. 3 illustrates half 112 along with a center axle 126, a bar which comprises connector 114 (see FIG. 7 for additional reference). Preferably, half 112 comprises a first gear 130, preferably a ring gear of a specific set radius extending from the center axis of the central axle 126, as shown. Preferably, half 112 also comprises a second gear 132, preferably concentric with the first gear 130, preferably also a ring gear of a specific set radius extending from the center axis of the central axle 126 and a set distance from first gear 130, as shown. Preferably, both the first gear 130 and second gear 132 are integral, as shown (also see FIG. 7) forming an annular ring, with a central axis 127 and a set of gear teeth 131, as shown. Preferably, the distance each concentric ring of first gear 130 and second gear 132 are apart represents a specific gear ratio. Preferably, the first gear 130 and second gear 132 are rotatable around the central axle 126. Such connection will be detailed further in FIG. 7 below.

Preferably, both the input shaft 106 and output shaft 108 are connected to the central axle 126. Preferably, the input shaft 106 is rotatable around the central axle 126 along a plane parallel to the concentric rings of first gear 130 and second gear 132, as shown. Preferably, the central axle 126 is perpendicular to both a central axis (axis of rotation 101) of the input shaft 106 and a central axis (axis of rotation 103) of the output shaft 108, as shown (embodying herein at least one bar, having at least one bar axis perpendicular to both such at least one first axis of rotation and such at least one second axis of rotation). Preferably, the input shaft 106 is connected to the central axle 126 by a yoke 128, (see FIG. 7). This arrangement embodies herein wherein both such at least one rotatable first shaft and such at least one rotatable second shaft are rotatably mounted to such bar. Upon reading the teachings of this specification, those with ordinary skill in the art will now understand that, under appropriate circumstances, considering such issues as economics, user preference, material selection, etc., other mounting arrangements, may suffice.

Preferably, in the illustrated embodiment of FIG. 3, the output shaft 108 is connected to half 112 in a fixed position, preferably using a collar 115, preferably a semi-circular collar, preferably metal, preferably screwed or riveted to half 112, as shown (also see FIG. 7). Preferably, the output shaft 108 is connected to the central axle 126 by a yoke 133 (see FIG. 7). Under appropriate circumstances, other arrangements may suffice. For example, the output shaft 108 does not necessarily have to be fixed; however, it is preferable. Further, multiple shafts may be used and only one shaft is preferably in a fixed position, as shown. Still further, it is noted the halves 110 and 112 and the shaft connections could be made on either half 110 or 112 without deterring the functions of the present invention.

Preferably, as stated above, the input shaft 106 is adjustable in a plurality of angular positions relative to the output shaft 108 and preferably comprises an angle-adjuster assembly 118, as shown. Preferably, the exterior perimeter 134 of half 110 and half 112 comprises a set of teeth, preferably comprising a plurality of equally spaced teeth 138, most preferably equally spaced squared teeth and equally spaced recesses 140, preferably extending completely around the exterior perimeter 134, as shown (embodying herein wherein such at least one housing comprises a circular periphery; and wherein such circular periphery comprises a set of evenly-spaced teeth). Upon reading the teachings of this specification, those with ordinary skill in the art will now understand that, under appropriate circumstances, considering such issues as economics, user preference, torque arrangements, durability, etc., other teeth arrangements, may suffice.

Preferably, the angle-adjuster assembly 118 comprises a second set of teeth 142, preferably made to adjoin and "lock" into the teeth 136, as shown. Preferably, the angle-adjuster assembly 118 comprises a spring mechanism 144, as shown and further described below in reference to FIG. 4. The above-described arrangement embodies herein wherein at least one of such at least one rotatable first shaft and at least one rotatable second shaft comprises at least one shaft housing element comprising at least one shaft housing tooth structured and arranged to fit between a pair of such evenly-spaced teeth; and wherein such at least one shaft housing tooth is removably engagable with such evenly-spaced teeth, wherein the user may set such at least one angle.

Preferably, the input shaft 106 further comprises a first-shaft gear 146, preferably encircling the entire circumference of the input shaft 106, as shown (embodying herein at least one rotatable first shaft comprising at least one first gear, having at least one first axis of rotation). Preferably, first-shaft gear 146 is fixed onto input shaft 106, preferably with a setscrew 147, as shown. Upon reading the teachings of this specification, those with ordinary skill in the art will now understand that, under appropriate circumstances, considering such issues as economics, user preference, technological advance, etc., other methods of fixing the first-shaft gear 146 onto input shaft 106, may suffice. Preferably, first-shaft gear 146 is placed on input shaft 106 such that first-shaft gear 146 will rotate second gear 132, as shown.

Preferably, the output shaft 108 further comprises a second-shaft gear 148, preferably encircling the entire circumference of the output shaft 108, as shown (embodying herein at least one rotatable second shaft comprising at least one second gear, having at least one second axis of rotation). Preferably, second-shaft gear 148 is fixed onto output shaft 108, preferably with a setscrew 149, as shown. Upon reading the teachings of this specification, those with ordinary skill in the art will now understand that, under appropriate circumstances, considering such issues as economics, user preference, technological advance, etc., other methods of fixing the second-shaft gear 148 is fixed onto output shaft 108, may suffice. Preferably, second-shaft gear 148 is placed on output shaft 108 such that second-shaft gear 148 will be rotated by first gear 130, as shown.

Preferably, rotation of input shaft 106 rotates first-shaft gear 146 and causes second gear 132 to rotate and also first gear 130 to rotate. Preferably, as first gear 130 rotates, it rotates the second shaft gear, thereby rotating the output shaft 108. Preferably, both halves 110 and 112 comprise such first gear 130 and second gear 132, thereby assisting in balancing the power (torque) transfer equally from the first-shaft gear 146 to the second-shaft gear 148, as shown (embodying herein balancing means for using opposed gear plates to balance torque transfer between such at least one first gear and such at least one second gear; and embodying herein at least one balancer structured and arranged to use opposed gear plates to balance torque transfer between such at least one first gear and such at least one second gear). In such manner, a rotation of the input shaft 106 results in a rotation of the output shaft 108 and vice versa.

Figure 4:
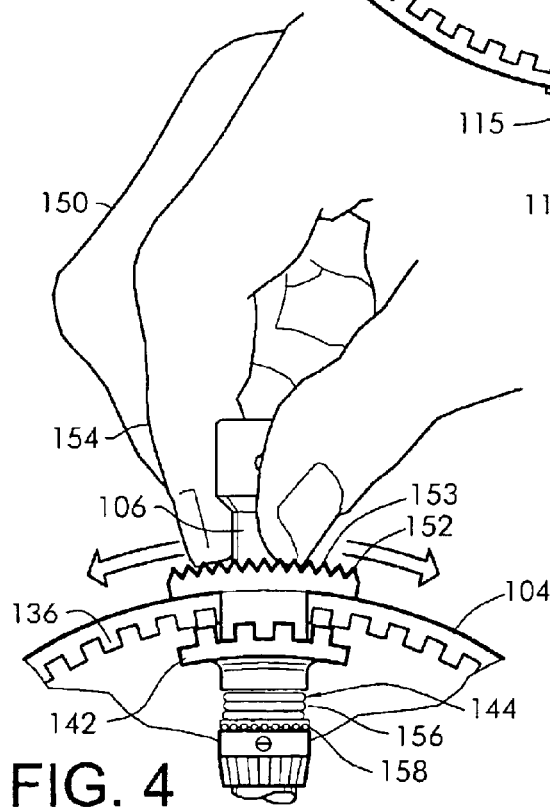
FIG. 4 is a detailed view of the angle-adjuster assembly according to a preferred embodiment of the present invention.

FIG. 4 is a detailed view of the angle-adjuster assembly 118 according to a preferred embodiment of the present invention. FIG. 4 illustrates a preferred use of the angle-adjuster assembly 118. Preferably, the angle-adjuster assembly comprises a housing 121, as shown (embodying herein wherein such angle setting means comprises housing means for positionally stabilizing the at least one angle). Preferably, a user 150 pushes the upper plate 152 of the spring mechanism 144 inward toward the housing 104 using fingers 154 with enough pressure to force the spring 156 to retract and allowing the gear 142 to disengage the gear teeth 136, as shown. Preferably, once the gear teeth 136 are disengaged, the input shaft 106 may be shifted to another position along the housing 104 (as indicated by the arrows). Preferably, the user places the angle-adjuster assembly 118 into a preferred position and the upper plate 152 is released, allowing the spring to be released and the gear 142 to re-engage the gear teeth 136, thereby positively locking the angle-adjuster assembly 118 (including housing 121) into place (embodying herein wherein such angle setting means comprises positive locking means for positive positional locking of the at least one angle; and embodying herein wherein such housing means comprises positive locking means for positive positional locking of the at least one angle). Upon reading the teachings of this specification, those with ordinary skill in the art will now understand that, under appropriate circumstances, considering such issues as economics, user preference, durability, ease of manufacture, etc., other angle adjuster arrangements, may suffice. Preferably, the upper plate 152 has a non-slip upper surface 153, preferably ribbed, as shown.

Figure 5:
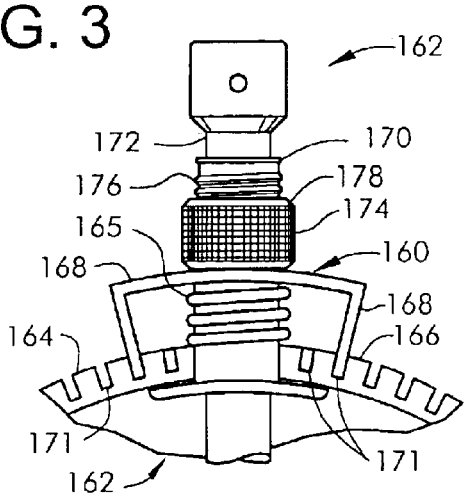
FIG. 5 is a detailed view of another angle-adjuster assembly according to another preferred embodiment of the present invention.

Further, it is preferred that the spring 156 sits adjacent a bearing assembly 158 that will allow the input shaft 106 to rotate without rotating the spring 156 and potentially interfering with the angle-adjuster assembly 118. Upon reading the teachings of this specification, those with ordinary skill in the art will now understand that, under appropriate circumstances, considering such issues as economics, user preference, durability, etc., other suitable spring 156 and bearing assembly 158 may be chosen without undue experimentation by those knowledgeable in the art. For example, FIG. 5 is a detailed view of another angle-adjuster assembly 160 according to another preferred embodiment 162 of the present invention. Preferably, in embodiment 162, the entire angle-adjuster assembly 160 is located along the exterior of the housing 164, as shown. Preferably, there is no spring in embodiment 162. Preferably, the gear teeth 166 are located along the exterior perimeter of the housing 104, as shown. Preferably, there is a pair of locking teeth 168, preferably squared locking teeth, that will fit into the gear recesses 171 of gear teeth 166, as shown. Preferably, the locking teeth 168 are adjusted by using a thumbscrew tightening arrangement wherein a portion 170 of the input shaft 172 comprises threading 176 (allowing the input shaft 172 to rotate freely), as shown. Preferably, a thumbscrew 178 comprising an exterior shell 174, preferably knurled, and internal threading (not shown) threadably attached to threading 176 such that rotating the thumbscrew 178 clockwise tightens the locking teeth 168 into gear teeth 166 and rotating the thumbscrew 178 counterclockwise releases the locking teeth 168 such that the input shaft 172 may be relocated to another position. Upon reading the teachings of this specification, those with ordinary skill in the art will now understand that, under appropriate circumstances, considering such issues as economics, user preference, etc., other arrangements to relocate the input shaft 172 to another location, may suffice.

FIG. 6 is a side view of the tool system of FIG. 1. FIG. 7 is a sectional view through section 7-7 of FIG. 1. FIG. 6 and FIG. 7 more clearly illustrate both halves 110 and 112 of the power transfer assembly 102 in an assembled position. As described above, each half 110 and 112 comprises a first gear 130 and a second gear 132. Preferably, having a respective gear 130 and gear 132 on each side of the first-shaft gear 146 and second-shaft gear 148 provides stability to the input shaft 106 and output shaft 108 as they are rotated equally. Preferably, there are two first gears 130, one on each respective half and mirrored to each other. And, preferably, there are two second gears 132 one on each respective half and mirrored to each other. Preferably, a gear plate 180, preferably annular, comprises a respective set of the gears 130 and 132, comprising first gear 130 and a second gear 132, as shown. Preferably, a gear plate 182, preferably annular, comprises another respective set of gears 130 and 132 comprising a first gear 130 and a second gear 132, as shown. This arrangement embodies herein at least one gear plate comprising at least one first unique circular set of first gear teeth on such at least one gear plate and at least one second unique circular set of second gear teeth on such at least one gear plate.

Preferably, each respective gear plate 180 and gear plate 182 are rotatably attached to the central axle 126, as shown. Preferably, each respective gear plate 180 and 182 comprises a central bearing 184. Preferably, the central bearing 184 is located in an inner aperture 186 of the annular opening in the center of each respective gear plate 180 and 182, as shown. Preferably, the central bearing 184 has an opening 188 structured and arranged to allow the central axle 126 to fit, and opening 188 is preferably round, as shown. Upon reading the teachings of this specification, those with ordinary skill in the art will now understand that, under appropriate circumstances, considering such issues as economics, user preference, durability, etc., other bearing arrangements, may suffice.

FIG. 7 illustrates a preferred method of assembly of the power transfer assembly 102. Preferably, a connector 114 is threadably attached to a half, for example, half 112, as shown. Preferably, a gear plate 180 is placed next to half 112 and adjacent yoke 128 and yoke 133 (with respective attached input shaft 106 and output shaft 108; the input shaft 106 being put through the angle-adjuster assembly 160 and then placed onto yoke 128, as shown) such that all are positioned in line with a central axis of the half 112, as shown. Upon reading the teachings of this specification, those with ordinary skill in the art will now understand that, under appropriate circumstances, considering such issues as economics, user preference, durability, manufacturing preferences, etc., other connection arrangements, may suffice.

Preferably, the central axle 126 is placed through the yoke 128 and yoke 133 and through a central bearing 184 placed in the annulus of gear 180 and threadably attached to the connector 114, as shown. Preferably, the gear plate 182 and respective central bearing 184 are then placed over an end 190 of the central axle 126, as shown. Preferably, the half 110 and another connector 114 are then threadably placed onto the central axle 126, as shown (embodying herein wherein such at least one bar connects such housing with such at least one rotatable first shaft and such at least one rotatable second shaft). Upon reading the teachings of this specification, those with ordinary skill in the art will now understand that, under appropriate circumstances, considering such issues as economics, user preference, durability, manufacturing preferences, etc., other connection arrangements, may suffice.

Preferably, the input shaft 106 and the output shaft 108 are attached to their respective yoke 128 and yoke 133, preferably using a groove 192 in the respective shaft and a c-clip 194 placed in the groove, as shown. Upon reading the teachings of this specification, those with ordinary skill in the art will now understand that, under appropriate circumstances, considering such issues as economics, user preference, durability, manufacturing preferences, etc., other attachment arrangements, may suffice. For example, a bearing may be placed at the end 196 of each shaft 106 and 108 to reduce frictional movement at that joint 198.

Preferably, in such manner as described above, a rotating tool (such as rotatable drill 120 shown in FIG. 2) attached to the input shaft 106 and rotated will preferably turn first-shaft gear 146, thereby turning gear plates 180 and 182, which will preferably turn gear 148 and rotate output shaft 108.

FIG. 8 is a side view of one-half of the tool drive system 100 illustrating power transfer assembly 200 comprising a gear adjusting mechanism 202 (embodying herein gear positioning means for positioning at least one of such at least one first gear and such at least one second gear in a gear-tooth-locking relationship with a user-selected one of such at least one first unique circular set of first gear teeth on such at least one gear plate and such at least one second unique circular set of second gear teeth on such at least one gear plate; and, embodying herein at least one gear positioner structured and arranged to position at least one of such at least one first gear and such at least one second gear in a gear-tooth-locking relationship with a user-selected one of such at least one first unique circular set of first gear teeth on such at least one gear plate and such at least one second unique circular set of second gear teeth on such at least one gear plate), preferably for the output shaft 204, according to another preferred embodiment of the present invention. Preferably, power transfer assembly 200 utilizes an input shaft 206 such as described for input shaft 106 above. However, power transfer assembly 200 preferably utilizes an output shaft 204 different from output shaft 108. Preferably, output shaft 204 may be adjusted such that it will rotate along the same gear path as input shaft assembly 206 or a separate gear path, as in the embodiment of FIG. 1. Preferably, in power transfer assembly 200 the gears 208 and 210 are closer together than in power transfer assembly 102 described above, to assist enabling the gear adjusting mechanism 202, as shown. Upon reading the teachings of this specification, those with ordinary skill in the art will now understand that, under appropriate circumstances, considering such issues as economics, user preference, durability, manufacturing preferences, etc., other arrangements, such as changing the gearing dimensions and spacing etc., may suffice.

FIG. 9 is a detail of the gear adjusting mechanism 202 of FIG. 8 according to another preferred embodiment of the present invention. FIG. 10 is an exploded view, partially in section, of the adjustable-gear drive shaft assembly 212 of the tool system of FIG. 8. Preferably, the output shaft 204 comprises an adjustable-gear drive shaft assembly 212 comprising a first shaft portion 214, a gear 216 and a second shaft portion 218, preferably telescopically movable within the first shaft portion 214, as shown. Preferably, first shaft portion 214 comprises three grooves 220, 221 and 222, as shown (embodying herein wherein such at least one rotatable first shaft further comprises a plurality of circumferential grooves). Preferably, groove(s) 220, 221 and 222 define a set longitudinal positions for gear 216 adjacent gear 208 and gear 210, as shown (embodying herein wherein at least one longitudinal position of at least one of such at least one first gear and such at least one second gear may be user selectable). Preferably, gear adjusting mechanism 202 is slidably attached to the output shaft 204 parallel and along each half 224 and 226 as well as affixed to each respective half 224 and half 226 (shown in FIG. 11), as shown. Preferably, the gear adjusting mechanism 202 comprises a button release 228 and pair of shaft engaging mechanisms 223, as shown (embodying herein wherein such at least one gear positioner comprises at least one spring-loaded retractable-pin element structured and arranged to stabilize at least one longitudinal position of such at least one rotatable first shaft by entry into at least one such circumferential groove). Preferably, gear 216 may be placed on either gear 208 or gear 210, as shown. Preferably, depressing button release 228 releases the first shaft portion 214 such that it can move either towards the central axle 230 or toward the housing perimeter 232, as shown. Preferably, movement of the first shaft portion 214 moves the gear 216. Preferably, groove 222 and groove 221 are aligned such that gear 216 will be on gear 208 when shaft engaging mechanism 223 of the gear adjusting mechanism 202 simultaneously lock into both groove 222 and groove 221 (as shown in FIG. 8). Although only two rings of gears (208 and 210) are shown, upon reading this specification those skilled in the art will understand that, under appropriate circumstances, depending upon how many gear ratios may be desired, upon appropriate circumstances of mechanics, space, and costs, N (a whole number over one) such rings of gears may be provided. This arrangement embodies herein wherein such at least one gear plate comprises N unique circular sets of gear teeth on such at least one gear plate; and such at least one gear positioner permits a user-selected positioning of at least one of such at least one first gear and such at least one second gear in a gear-tooth-locking relationship with a user-selected one of such N unique circular sets of gear teeth on such at least one gear plate.

Preferably, groove 220 and groove 222 are aligned such that gear 216 will be on gear 210 when shaft-engaging mechanism 223 of the gear adjusting mechanism 202 simultaneously locks into both groove 220 and groove 222. Preferably, a user may adjust such gearing as desired and provide a one to one gear ratio by using the same gear 210 as the input shaft 206 or a different gearing by utilizing gear 208 (embodying herein wherein a gear ratio may be user selected). Upon reading the teachings of this specification, those with ordinary skill in the art will now understand that, under appropriate circumstances, considering such issues as economics, user preference, durability, manufacturing preferences, etc., other gearing arrangements, may suffice.

Figure 11:
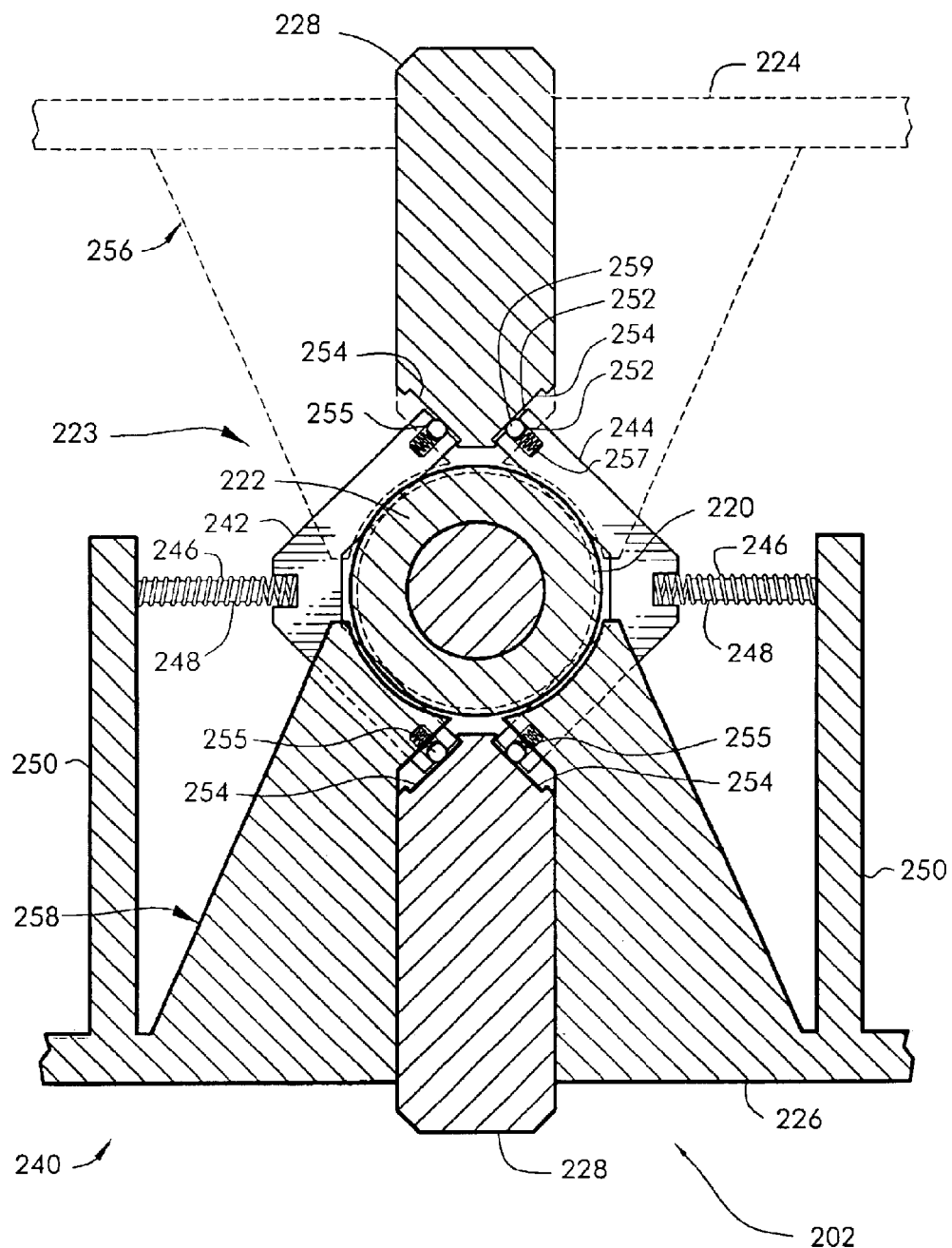
FIG. 11 is a sectional view through section 11—11 of FIG. 8 of a button adjusting mechanism in a static position according to another embodiment of the present invention.

FIG. 11 is a sectional view through section 11-11 of FIG. 8 of a button adjusting mechanism 202 in a static position 240 according to another embodiment of the present invention.

Figure 12:
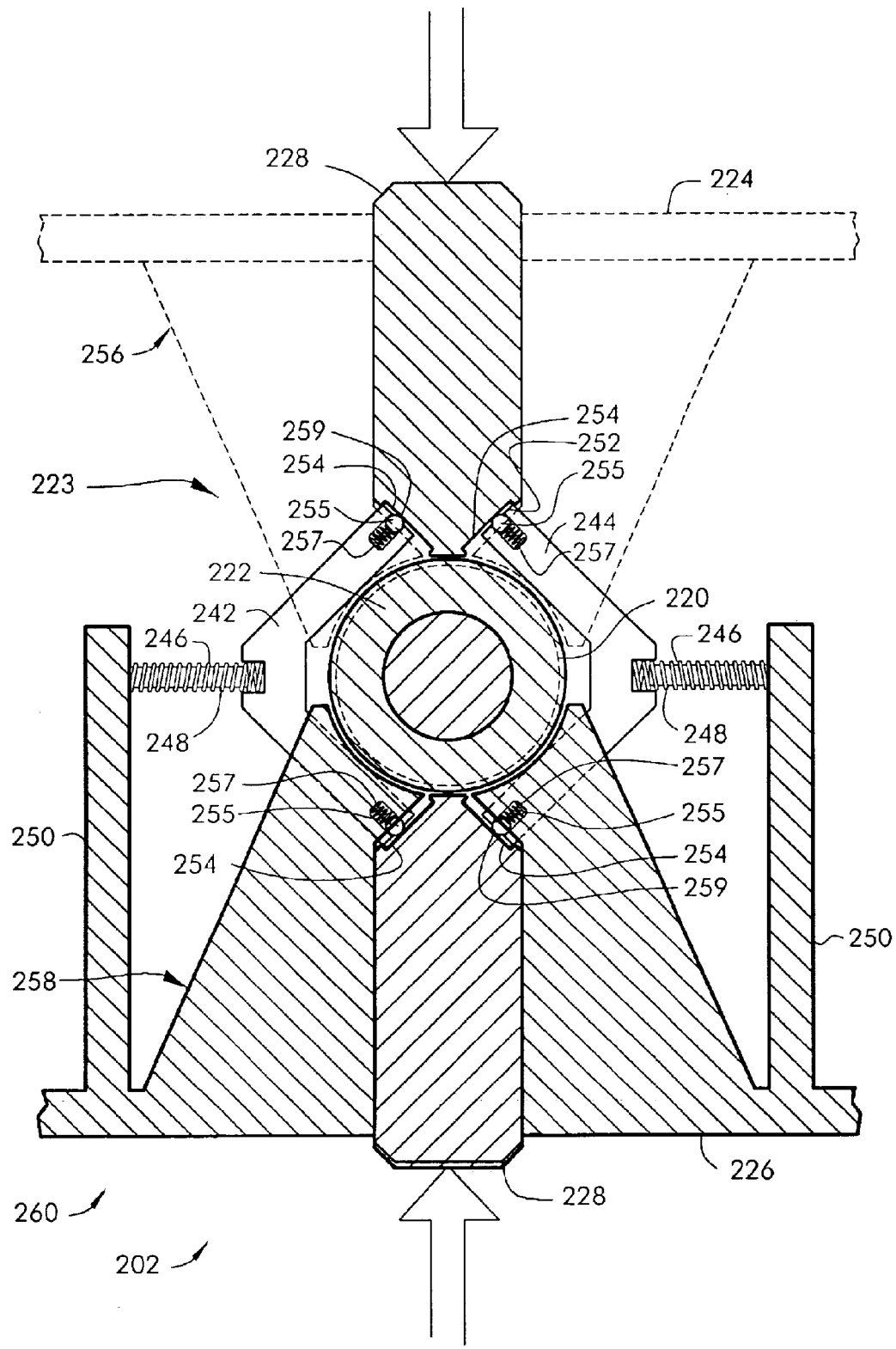
FIG. 12 is another sectional view of the button adjusting mechanism of FIG. 11 showing a different position of buttons in an operable position.

FIG. 12 is another sectional view of the button adjusting mechanism 202 of FIG. 11 showing a different position of buttons in an operable position 260. Preferably, the gear adjusting mechanism 202 comprises two V-clips 242 and 244, preferably mirrored to each other, as shown. Preferably, each respective V-clip 242 and 244 is spring tensioned towards the other V-clip by springs 246, preferably equal in tension, as shown. Preferably, each respective spring 246 is mounted on a stop 248, as shown. Preferably, each respective stop 248 provides a stop such that each respective V-clip 242 and 244 may only travel a set distance in an opposite direction from each other respective V-clip 242 or 244, as shown. Upon reading the teachings of this specification, those with ordinary skill in the art will now understand that, under appropriate circumstances, considering such issues as economics, user preference, durability, manufacturing preferences, etc., other clip arrangements, such as U-clips etc., may suffice. Preferably, each respective stop 248 is attached to a half 226 by a post 250, as shown. Under appropriate circumstances, other attachment or support arrangements may suffice.

Preferably, button adjusting mechanism 202 further comprises a button release 228, preferably situate about ninety-degrees from a longitudinal axis of each stop 248 such that a respective end 252 of each V-clip 242 and 244 is tightly adjacent an end 254 of the button release 228, as shown. Furthermore, it is preferred that each respective end 252 of each V-clip 242 and 244 comprises a bearing assembly 255 that assists the movement of the V-clip 242 and 244 along the end 254 of the button release 228, as shown. Preferably, each bearing assembly 255 comprises a spring tensioner 257 to maintain contact between the bearing 259 and an end 254 of the button release 228, as shown. Preferably, the end 254 of the button release 228 is about forty-five degrees angled, as shown, and the end 252 of the V-clip 242 and 244 is also about forty-five degrees angled, as shown. Upon reading the teachings of this specification, those with ordinary skill in the art will now understand that, under appropriate circumstances, considering such issues as economics, user preference, durability, etc., other arrangements for the button adjusting mechanism 202, may suffice.

In such manner as described above and illustrated, depressing of the button release mechanism pushes each respective V-clip 242 and 244 against the respective spring 246 and towards stop 248, preferably causing the V-clips 242 and 244 to release from the respective groove 220 (or 221/222) and allowing movement of shaft 214, as shown. Further, it is preferable that gear adjusting mechanism 202 is attached to each respective half 224 and 226 by attachment base plates 256 and 258, preferably U-shaped, as shown. Upon reading the teachings of this specification, those with ordinary skill in the art will now understand that, under appropriate circumstances, considering such issues as economics, user preference, etc., other suitable adjusting arrangements, such as other styles of button arrangements, etc., may suffice.

Figure 13:
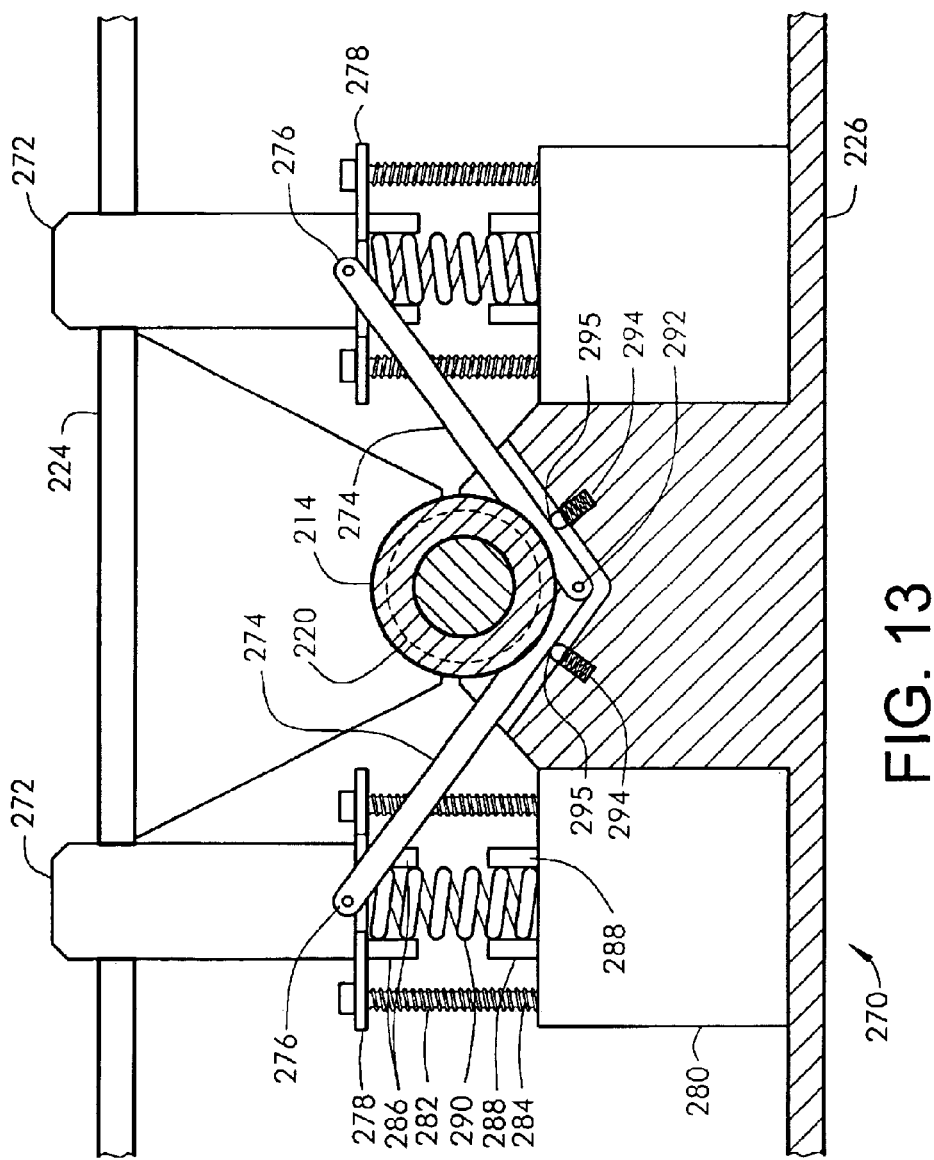
FIG. 13 is a similar sectional view of another button adjusting mechanism showing a one-button embodiment according to yet another preferred embodiment of the present invention.

FIG. 13 is a sectional view of another button adjusting mechanism 272 for the gear adjusting mechanism 202 of FIG. 8, according to yet another preferred embodiment 270 of the present invention. In this embodiment 270, the buttons 272 are located on a single half (half 220 is shown) of the power transfer assembly 102, which is preferably attached to both halves 224 and 226, as shown. Preferably, button adjusting mechanism 272 comprises a pair of lever-arms 274 which are mechanically moved in and out of the groove 220 or 222, as shown. Preferably, such mechanical movement is accomplished by use of dual buttons 272, each respective button 272 connected to one end 276 of lever-arms 274, as shown. Preferably, each respective button 272 comprises a movable platform 278, preferably spring mounted above an immovable platform 280, preferably attached to a half 226, as shown. Preferably, the movable platform 278 comprises springs 282 mounted on screws 284, as shown. Preferably, the springs 282 push the movable platform 278 toward half 224, in conjunction with a return spring 290, when the buttons 272 are not being pushed by a user. Preferably, each respective movable platform 278 also comprises at least one stop 286, as shown. Preferably, the immovable platform 280 also comprises at least one stop 288, preferably aligned with stop 286, as shown. Preferably, the lever-arms 274 are connected at pivot point 292, as shown. Preferably, each respective lever-arm 274 comprises a return spring 294 (and bearing 295), as shown. Under appropriate circumstances, other arrangements may suffice. Even further, preferably two pairs of button adjusting mechanism 272 are required to lock four lever-arms 274 into grooves 220 and 222. Four button tops extending from half 224 are connected in pairs by external attachers, preferably thin sheet metal so that all the lever-arms 274 operate simultaneously. Upon reading the teachings of this specification, those with ordinary skill in the art will now understand that, under appropriate circumstances, considering such issues as economics, user preference, etc., other connection arrangements, may suffice.

In operation, a user presses both buttons 272. Preferably, when both buttons 272 are depressed the lever-arms 274 are pushed down and away from the groove 220, 221 or 222 allowing movement of shaft 214, as shown and described above. Upon reading the teachings of this specification, those with ordinary skill in the art will now understand that, under appropriate circumstances, considering such issues as economics, user preference, etc., other sufficient means to adjust and lock gear 216 into place, may suffice.

Figure 14:
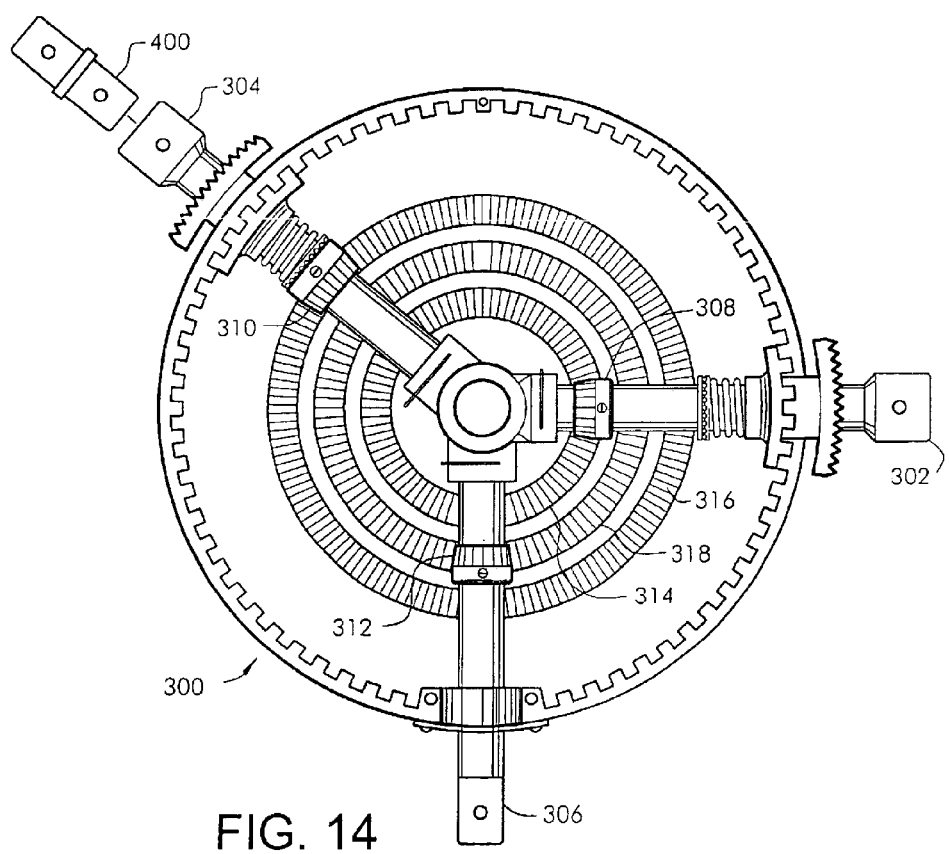
FIG. 14 is a side view of one-half of the tool drive system illustrating a three-drive-shaft embodiment according to another preferred embodiment of the present invention.

FIG. 14 is a side view of one-half of the tool drive system 100 illustrating a three-drive-shaft embodiment 300 according to another preferred embodiment of the present invention. Preferably, the three-drive-shaft embodiment 300 comprises input shaft 302, input shaft 304 and one output shaft 306, as shown (embodying herein wherein such at least one rotatable first shaft further comprises at least two first shafts, each respective shaft comprising at least one first gear, having at least one first axis of rotation). Preferably, each respective input shaft 302, input shaft 304 and output shaft 306 comprise a respective gear 308, 310, and 312 specifically connected to a respective transfer gear 314, 316, and 318, as shown. The remaining portions of the three-drive-shaft embodiment 300 are similar to the two-shaft embodiment of FIG. 1 and FIG. 3 described above. Preferably, the three-drive-shaft embodiment 300 provides multiple drive gear ratios without having to move an adjustable gear such as described in FIG. 8. It is noted that, in light of the teachings herein, under appropriate circumstances, other combinations of gearing and drive shafts may be provided without detracting from the functions of the described embodiments.

Preferably, use of adapter 400 can interchange input shaft 304 to an output shaft for increased rotational speed.

Although applicant has described applicant's preferred embodiments of this invention, it will be understood that the broadest scope of this invention includes such modifications as diverse shapes and sizes and materials. Such scope is limited only by the below claims as read in connection with the above specification.

Further, many other advantages of applicant's invention will be apparent to those skilled in the art from the above descriptions and the below claims:

What is claimed is:

1. A tool drive system comprising:
a) at least one rotatable first shaft, comprising at least one first gear, having at least one first axis of rotation;
b) at least one rotatable second shaft, comprising at least one second gear, having at least one second axis of rotation; and
c) at least one movement transferer structured and arranged to rotate said at least one rotatable second shaft when said at least one rotatable first shaft is rotated;
d) wherein said at least one movement transferer further comprises
  i) at least one connector structured and arranged to connect said at least one rotatable first shaft and said at least one rotatable second shaft,
  ii) at least one angle setter structured and arranged to set at least one angle between said at least one first axis of rotation and said at least one second axis of rotation, and
  iii) at least one balancer structured and arranged to use opposed gear plates to balance torque transfer between said at least one first gear and said at least one second gear;
e) wherein said at least one rotatable first shaft further comprises at least two positively each respective shaft comprising at least one first gear, having at least one first axis of rotation;
f) wherein said angle setter comprises a positive lock structured and arranged to positively positionally lock the at least one angle;

g) wherein said at least one angle setter comprises at least one housing structured and arranged to positionally stabilize the at least one angle;

h) at least one gear plate comprising at least one first unique circular set of first gear teeth on said at least one gear plate and at least one second unique circular set of second gear teeth on said at least one sear plate; and i) at least one gear positioner structured arid arranged to position at least one of said at least one first gear and said at least one second gear in a gear-tooth-locking relationship with a user-selected one of said at least one first unique circular set of first gear teeth on said at least one gear plate and said at least one second unique circular set of second gear teeth on said at least one gear plate.

2. A tool drive system comprising:

a) at least one rotatable first shaft, comprising at least one first gear, having at least one first axis of rotation;

b) at least one rotatable second shaft, comprising at least one second gear, having at least one second axis of rotation; and c) at least one movement transferer structured and arranged to rotate said at least one rotatable second shaft when said at least one rotatable first shaft is rotated;

d) wherein said at least one movement transferer further comprises
  i) at least one connector structured and arranged to connect said at least one rotatable first shaft and said at least one rotatable second shaft,
  ii) at least one angle setter structured and arranged to set at least one angle between said at least one first axis of rotation and said at least one second axis of rotation, and
  iii) at least one balancer structured and arranged to use opposed gear plates to balance torque transfer between said at least one first gear and said at least one second gear;

e) at least one gear plate comprising at least one first unique circular set of first gear teeth on said at least one gear plate and at least one second unique circular set of second gear teeth on said at least one gear plate; and f) at least one gear positioner structured and arranged to position at least one of said at least one first gear and said at least one second gear in a gear-tooth-locking relationship with a user-selected one of said at least one first unique circular set of first gear teeth on said at least one gear plate and said at least one second unique circular set of second gear teeth on at least one gear plate;

g) wherein said at least one angle setter comprises at least one housing structured and arranged to positionally stabilize the at least one angle.

3. A tool drive system comprising:

a) at least one rotatable first shaft, comprising at least one first gear, having at least one first axis of rotation;

b) at least one rotatable second shaft, comprising at least one second gear, having at least one second axis of rotation; and c) at least one movement transferer structured and arranged to rotate said at least one rotatable second shaft when said at least one rotatable first shaft is rotated;

d) wherein said at least one movement transferer further comprises
  i) at least one connector structured and arranged to connect said at least one rotatable first shaft and said at least one rotatable second shaft, and
  ii) at least one angle setter structured and arranged to set at least one angle between said at least one first axis of rotation and said at least one second axis of rotation; and e) wherein said at least one connector comprises at least one bar, having at least one bar axis perpendicular to both said at least one first axis of rotation and said at least one second axis of rotation, and f) wherein both said at least one rotatable first shaft and said at least one rotatable second shaft are rotatably mounted to said bar;

g) at least one gear plate comprising at least one first unique circular set of first gear teeth on said at least one gear plate and at least one second unique circular set of second gear teeth on said at least one gear plate; and h) at least one gear positioner structured and arranged to position at least one of said at least one first gear and said at least one second gear in a gear-tooth-locking relationship with a user-selected one of said at least one first unique circular set of first gear teeth on said at least one gear plate and said at least one second unique circular set of second gear teeth on said at least one gear plate;

i) wherein said at least one angle setter comprises at least one housing structured and arranged to positionally stabilize the at least one angle.

4. A tool drive system comprising:

a) at least one rotatable first shaft, comprising at least one first gear, having at least one first axis of rotation;

b) at least one rotatable second shaft, comprising at least one second gear, having at least one second axis of rotation; and c) at least one movement transferer structured and arranged to rotate said at least one rotatable second shaft when said at least one rotatable first shaft is rotated;

d) wherein said at least one movement transferer further comprises
  i) at least one connector structured and arranged to connect said at least one rotatable first shaft and said at least one rotatable second shaft, and
  ii) at least one angle setter structured and arranged to set at least one angle between said at least one first axis of rotation and said at least one second axis of rotation, and e) wherein said at least one angle setter comprises at least one positive lock structured and arranged to positively positionally lock the at least one angle;

f) at least one gear plate comprising at least one first unique circular set of first gear teeth on said at least one gear plate and at least one second unique circular set of second gear teeth on said at least one gear plate;

g) at least one gear positioner structured and arranged to position at least one of said at least one first gear and said at least one second gear in a gear-tooth-locking relationship with a user-selected one of said at least one first unique circular set of first gear teeth on said at least one gear plate and said at least one second unique circular set of second gear teeth on said at least one gear plate;

h) wherein said at least one angle setter comprises at least one housing structured and arranged to positionally stabilize the at least one angle.

5. The tool drive system according to claim 4 wherein:

a) said at least one housing comprises a circular periphery;

b) said circular periphery comprises a set of evenly-spaced teeth;

c) at least one of said at least one rotatable first shaft and at least one rotatable second shaft comprises at least one shaft housing element comprising at least one shaft housing tooth structured and arranged to fit between a pair of said evenly-spaced teeth; and d) said at least one shaft housing tooth is removably engagable with said evenly-spaced teeth, wherein the user may set said at least one angle.

6. A tool drive system comprising, in combination:

a) at least one rotatable first shaft, comprising at least one first gear, having at least one first axis of rotation;

b) at least one rotatable second shaft, comprising at least one second gear, having at least one second axis of rotation;

c) at least one movement transferer structured and arranged to rotate said at least one rotatable second shaft when said at least one rotatable first shaft is rotated;

d) at least one gear plate comprising at least one first unique circular set of first gear teeth on said at least one gear plate and at least one second unique circular set of second gear teeth on said at least one gear plate; and e) at least one gear positioner structured and arranged to position at least one of said at least one first gear and said at least one second gear in a gear-tooth-locking relationship with a user-selected one of said at least one first unique circular set of first gear teeth on said at least one gear plate and said at least one second unique circular set of second gear teeth on said at least one gear plate;

f) wherein said at least one movement transferer further comprises
i) at least one connector structured and arranged to connect said at least one rotatable first shaft and said at least one rotatable second shaft, and
ii) at least one angle setter structured and arranged to set at least one angle between said at least one first axis of rotation and said at least one second axis of rotation; and g) wherein said at least one angle setter comprises at least one housing structured and arranged to positionally stabilize the at least one angle.

7. The tool drive system according to claim 6 wherein:

a) said at least one gear plate comprises N unique circular sets of gear teeth on said at least one gear plate; and b) said at least one gear positioner permits a user-selected positioning of at least one of said at least one first gear and said at least one second gear in a gear-tooth-locking relationship with a user-selected one of said N unique circular sets of gear teeth on said at least one gear plate;

c) wherein N is a whole number greater than one.

8. The tool drive system according to claim 7 wherein said at least one angle setter comprises at least one positive lock structured and arranged to positively positionally lock the at least one angle.

9. The tool drive system according to claim 8 wherein said at least one rotatable first shaft further comprises a plurality of circumferential grooves.

10. The tool drive system according to claim 9 wherein:

a) said at least one gear positioner comprises at least one spring-loaded retractable-pin element structured and arranged to stabilize at least one longitudinal position of said at least one rotatable first shaft by entry into at least one said circumferential groove;

b) wherein at least one longitudinal position of at least one of said at least one first gear and said at least one second gear may be user selectable; and c) wherein a gear ratio may be user selected.

11. A tool drive system comprising:

a) at least one rotatable first shaft, comprising at least one first gear, having at least one first axis of rotation;

b) at least one rotatable second shaft, comprising at least one second gear, having at least one second axis of rotation; and c) at least one movement transferer structured and arranged to rotate said at least one rotatable second shaft when said at least one rotatable first shaft is rotated;

d) wherein said at least one movement transferer further comprises
i) at least one connector structured and arranged to connect said at least one rotatable first shaft and said at least one rotatable second shaft,
ii) at least one angle setter structured and arranged to set at least one angle between said at least one first axis of rotation and said at least one second axis of rotation; and
iii) at least one balancer structured and arranged to use opposed gear plates to balance torque transfer between said at least one first gear and said at least one second gear;

e) wherein said at least one angle setter comprises at least one housing structured and arranged to positionally stabilize the at least one angle; and f) wherein said at least one housing comprises at least one positive lock structured and arrange to positively positionally lock the at least one angle;

g) at least one gear plate comprising at least one first unique circular set of first gear teeth on said at least one gear plate and at least one second unique circular set of second gear teeth on said at least one gear plate; and h) at least one gear positioner structured and arranged to position at least one of said at least one first gear and said at least one second gear in a gear-tooth-locking relationship with a user-selected one of said at least one first unique circular set of first gear teeth on said at least one gear plate and said at least one second unique circular set of second gear teeth on said at least one gear plate.

12. The tool drive system according to claim 11 wherein said at least one connector comprises:

a) at least one bar, having at least one bar axis perpendicular to both said at least one first axis of rotation and said at least one second axis of rotation;

b) wherein both said at least one rotatable first shaft and said at least one rotatable second shaft are rotatably mounted to said bar.

13. The tool drive system according to claim 12 wherein said at least one bar connects said housing with said at least one rotatable first shaft and said at least one rotatable second shaft.

14. The tool drive system according to claim 13 wherein:

a) said at least one housing comprises a circular periphery;

b) said circular periphery comprises a set of evenly-spaced teeth;

c) at least one of said at least one rotatable first shaft and at least one rotatable second shaft comprises at least one shaft housing element comprising at least one shaft housing tooth structured and arranged to fit between a pair of said evenly-spaced teeth; and d) said at least one shaft housing tooth is removably engageable with said evenly-spaced teeth, wherein the user may set said at least one angle.

* * * * *

UNITED STATES PATENT AND TRADEMARK OFFICE
CERTIFICATE OF CORRECTION

PATENT NO. : 6,923,093 B2
DATED : August 2, 2005
INVENTOR(S) : Ullah, Rizwan

It is certified that error appears in the above-identified patent and that said Letters Patent is hereby corrected as shown below:

Column 16,
Line 62, "two positively each" should read -- two first shafts, each --.

Column 17,
Line 7, "sear" should read -- gear --.
Line 8, "arid" should read -- and --.
Line 48, "teeth on at least" should read -- teeth on said at least --.

Column 18,
Line 51, after "one gear plate;" insert -- and --.

Column 20,
Line 20, "structured and arrange" should read -- structured and arranged --.

Signed and Sealed this

Thirteenth Day of December, 2005

JON W. DUDAS
*Director of the United States Patent and Trademark Office*